US009785978B1

(12) United States Patent
Dietrich et al.

(10) Patent No.: US 9,785,978 B1
(45) Date of Patent: Oct. 10, 2017

(54) DYNAMIC CONTENT CONTROL IN AN INFORMATION PROCESSING SYSTEM

(71) Applicant: EMC Corporation, Hopkinton, MA (US)

(72) Inventors: David Dietrich, Hopedale, MA (US); Beibei Yang, Marlborough, MA (US); Barry William Heller, Medway, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 127 days.

(21) Appl. No.: 14/225,959

(22) Filed: Mar. 26, 2014

(51) Int. Cl.
*G06Q 30/00* (2012.01)
*G06Q 30/02* (2012.01)

(52) U.S. Cl.
CPC .............................. *G06Q 30/0271* (2013.01)

(58) Field of Classification Search
CPC ................................................ G06C 30/0271
See application file for complete search history.

(56) References Cited

U.S. PATENT DOCUMENTS

| | | | | |
|---|---|---|---|---|
| 5,404,488 A * | 4/1995 | Kerrigan | ............ | G06F 17/3056 |
| | | | | 707/E17.005 |
| 7,966,219 B1 * | 6/2011 | Singh | ..................... | G06Q 30/02 |
| | | | | 705/26.7 |
| 8,738,733 B1 * | 5/2014 | Walters | ............... | G06F 17/3053 |
| | | | | 705/14.49 |
| 2003/0208754 A1 * | 11/2003 | Sridhar | .................. | G06Q 30/02 |
| | | | | 725/34 |
| 2005/0189414 A1 * | 9/2005 | Fano | ....................... | G06Q 30/02 |
| | | | | 235/383 |
| 2007/0078849 A1 * | 4/2007 | Slothouber | ....... | G06F 17/30867 |
| 2009/0132559 A1 | 5/2009 | Chamberlain et al. | | |
| 2010/0017386 A1 | 1/2010 | Anderson et al. | | |
| 2010/0331146 A1 | 12/2010 | Kil | | |
| 2011/0066507 A1 * | 3/2011 | Iyer | ........................ | G06Q 30/02 |
| | | | | 705/14.66 |
| 2012/0123830 A1 * | 5/2012 | Svendsen | ........... | G06Q 30/0252 |
| | | | | 705/14.5 |

OTHER PUBLICATIONS

W.W. Moe et al., "Uncovering Patterns in Cybershopping," California Management Review, Jul. 2001, pp. 106-117, vol. 43, No. 4.

(Continued)

*Primary Examiner* — Bennett Sigmond
*Assistant Examiner* — Scott C Anderson
(74) *Attorney, Agent, or Firm* — Ryan, Mason & Lewis, LLP (57) ABSTRACT

A dynamic content controller is configured for communication with one or more data sources. The dynamic content controller comprises an analytics engine and a personalization engine coupled to the analytics engine. The analytic engine is configured to analyze multiple types of disaggregated data collected from the one or more data sources during a current content browsing session. The personalization engine is configured to adapt content to be presented based at least in part on the analysis of the disaggregated data. The adaptation of the content to be presented is performed during the current content browsing session.

20 Claims, 3 Drawing Sheets

(56) References Cited

OTHER PUBLICATIONS

W.W. Moe et al., "Fast-Track Article Using Advance Purchase Orders to Forecast New Product Sales," Marketing Science, Jan. 2002, pp. 347-364, vol. 21, No. 3.
Ruud Verheijden, "Predicting Purchasing Behavior Throughout the Clickstream," Eindhoven University of Technology, Identity No. 0609445, Nov. 2012, 32 pages.
Michael H. Hoppe, "Culture and Leader Effectiveness: The GLOBE Study," Sep. 2007, 6 pages.
globalizationpartners.com, "Creating Culturally Customized Content for Website Translation," Translation Blog,, http://blog.globalizationpartners.com/culturally-customized-website.aspx, Aug. 2011, 6 pages.
A. Marcus et al., "Crosscurrents: Cultural Dimensions and Global Web User-Interface Design," Interactions, Jul./Aug. 2000, pp. 32-46, vol. 7, No. 4.
Wikipedia, "Hofstede's Cultural Dimensions Theory," http://en.wikipedia.org/w/index.php?title=Hofstede%27s_cultural_dimensions_theory&printable=yes, Nov. 2014, 14 pages.
A. Marcus et al., "Cultural Dimensions and Global Web UI Design: What? So What? Now What?" Aaron Marcus and Associates, Inc., AM+A, Jun. 2000, 27 pages.

\* cited by examiner

DYNAMIC CONTENT CONTROL IN AN INFORMATION PROCESSING SYSTEM

FIELD

The field relates generally to information processing systems, and more particularly to dynamic content control utilized within such systems.

BACKGROUND

As is known, a website (or simply, site) is typically comprised of a set of related web pages (content) served from a web domain hosted on at least one web server. The web server is accessible via a communication network such as the Internet or a private local area network through an Internet address. Websites have become a predominant way for a company to offer and sell its products. Today, it is relatively easy to obtain aggregated counts of unique website visitors and website activity, but most web analysts or social marketing analysts do not know the key drivers that determine whether a site visitor will purchase a given product or not.

In addition, today it is difficult to determine why people choose to visit a particular webpage at a specific point in time and/or what they are looking for online that led them to the particular site. Moreover, the content rendered on most company websites tends to be relatively static.

SUMMARY

Illustrative embodiments of the present invention provide analytic techniques for dynamic content control. In the context of a website, for example, such analytic techniques permit, in real-time or near real-time, site visitor segmentation, product recommendations, and/or advertisement placement functionality during content presentation on a website.

In one embodiment, a dynamic content controller is configured for communication with one or more data sources. The dynamic content controller comprises an analytics engine and a personalization engine coupled to the analytics engine. The analytic engine is configured to analyze multiple types of disaggregated data collected from the one or more data sources during a current content browsing session. The personalization engine is configured to adapt content to be presented based at least in part on the analysis of the disaggregated data. The adaptation of the content to be presented is performed during the current content browsing session, thus making the adaptation real-time or near real-time.

Other embodiments include without limitation methods, apparatus, systems, and articles of manufacture comprising processor-readable storage media.

DETAILED DESCRIPTION

Illustrative embodiments of the invention will be described herein with reference to exemplary information processing systems and associated dynamic content controllers implemented using one or more processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination. The term "dynamic content controller" is also intended to be broadly construed so as to encompass a variety of different arrangements for performing analytics on data sources to generate in real-time personalized content for presentation.

As used herein, the term "in-memory" refers to "main memory" such as, for example, an in-memory database (i.e., IMDB; also main memory database system or MMDB or memory resident database) which is a database management system that primarily relies on main memory for computer data storage. It is contrasted with database management systems that employ a disk storage mechanism. Main memory databases are faster than disk-optimized databases since the internal optimization algorithms are simpler and execute fewer CPU instructions. Accessing data in memory eliminates seek time when querying the data, which provides faster and more predictable performance than disk. In applications where response time is critical, such as telecommunications network equipment and mobile advertising networks, main memory databases are often used. Furthermore, data analytics taking place in main memory (in-memory) can be performed much faster than when the analytics require retrieving and interacting with data on disk. Examples of the in-memory databases that can be employed in accordance with illustrative embodiments of the invention include, but are not limited to, SQLFire™, GemFire™, or GemFire XD™.

Further, as used herein, the term "dynamic" refers to a content control functionality using a dynamic content controller according to one or more embodiments of the invention that provides, for example, customized content, ads, and user experience based on the user and site visit. As a visitor continues to browse the site, the customized recommendation will get refined thus improving the overall site experience for the site visitors. As mentioned above, many sites are static today. That is, regardless of who you are or what you are looking for, you are offered the same prices, the same products, and shown the same ads if you visit a static website. This is a very suboptimal experience, and provides a very generic and low-value user experience.

The term "disaggregated," as used herein, refers to data that, at least substantially, has not been summarized and/or combined. Aggregated data is generally thought of in terms of sums and combinations of attributes into groups. For instance, often someone who analyzes web traffic will look at high level, summary counts of site visitors. This tells the web analyst only very high-level information, such as whether their web traffic is increasing, decreasing, or the same. Otherwise, it tells them very little. By contrast, disaggregated data refers to data that has not been summarized and/or combined. Disaggregated data is the low-level detailed, original, raw data that describes individual user-level behavior on the site including, but not limited to, clickstream data, Internet Protocol (IP) addresses, and other information that is available at a granular level and can be used as an input to more sophisticated analytics (e.g., collaborative filtering, time series and autoregressive integrated moving average (ARIMA) analyses, clustering techniques and others).

Figure 1:
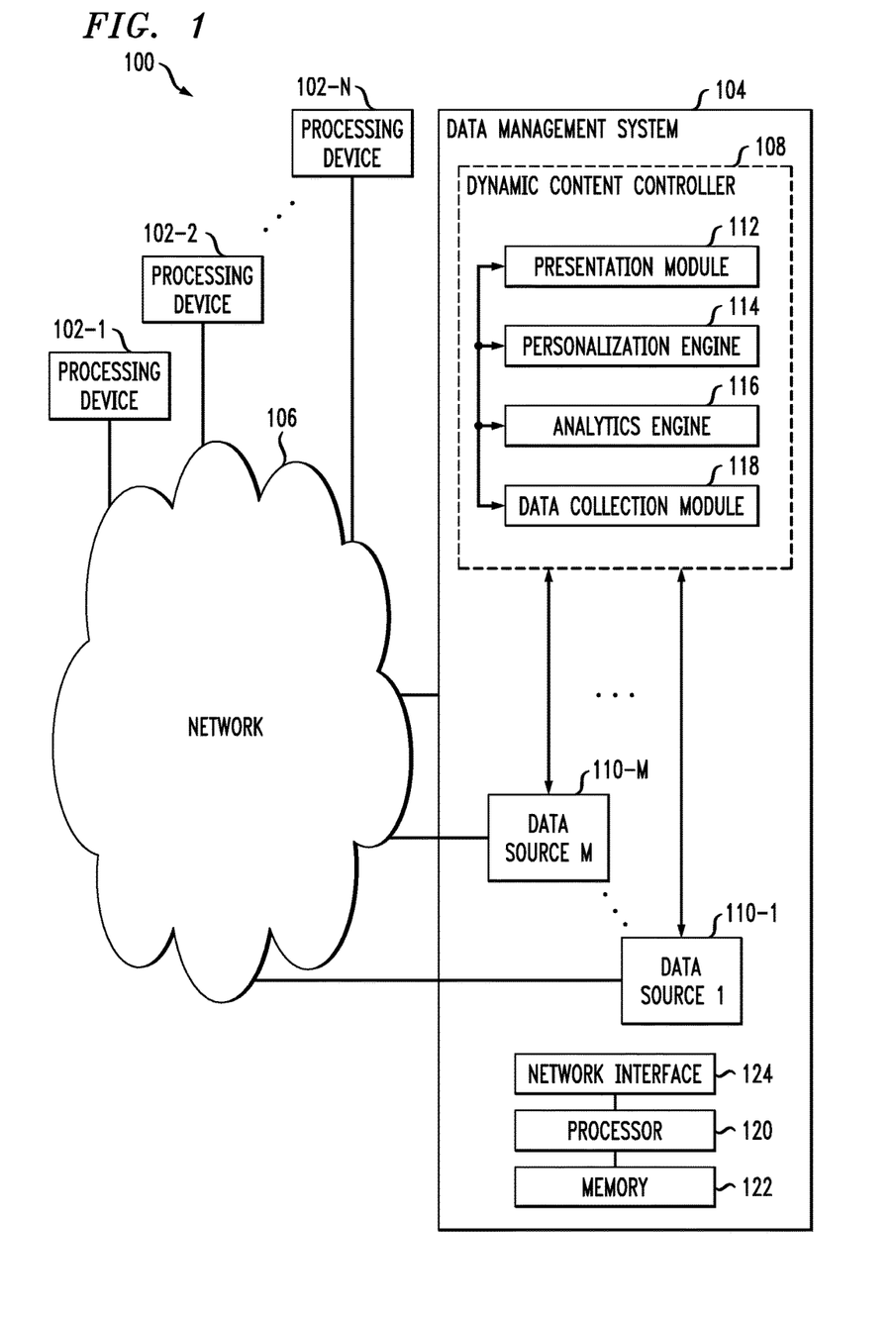
FIG. 1 is a block diagram of an information processing system comprising a data management system with analytic techniques for dynamic content control in an illustrative embodiment of the invention.

FIG. 1 shows an information processing system 100 configured in accordance with an illustrative embodiment of the invention. The information processing system 100 comprises a plurality of processing devices 102-1, 102-2, . . . 102-N and a data management system 104 that communicate with one another over a network 106. The data management system 104 comprises a dynamic content controller 108 and a plurality of data sources 110-1, 110-2, . . . 110-M coupled to the dynamic content controller 108. The dynamic content controller 108 comprises a presentation module 112, a personalization engine 114, an analytics engine 116, and a data collection module 118, operatively coupled to one another. While all of these components can operate in conjunction with main memory (in-memory), at least personalization engine 114 and analytics engine 116 preferably operate as such.

These components of the dynamic data controller 108 (i.e., presentation module 112, personalization engine 114, analytics engine 116, and data collection module 118) are configured to autonomously recommend personalized and most-relevant information to a website visitor based on current user behaviors, as well as past user behaviors, as will be explained in further detail below in the context of FIG. 2. This personalization and recommendation (made in accordance with personalization engine 114) is accomplished in real-time, or near real-time, such that a website visitor is able to experience the dynamic content in a current browsing session. Thus, embodiments of the invention make it feasible to store, analyze and use behavioral characteristics to classify website visitors (in accordance with analytics engine 116) and serve them dynamically rendered content (in accordance with presentation module 112) in real-time or near real-time. By employing such a comprehensive in-memory dynamic content solution, content on a website becomes more "predictive" in nature.

The data sources 110 (110-1, 110-2, . . . 110-M) illustratively store multiple types of raw data (i.e., disaggregated data) associated with one or more website visitor's behavior. For example, such raw data stored in data sources 110 includes, but is not limited to, IP data of usage behavior, website usage data, clickstream data, social media data, and website referral data. A given type of raw data can be stored in a specific one of the data sources or across more than one of the data sources. Data collection module 118 collects the raw data stored in data sources 110, as will be further explained below.

Although the data sources 110 are shown in the FIG. 1 embodiment as being implemented within the data management system 104, in other embodiments at least a subset of the data sources 110 may be implemented at least in part externally to the data management system 104. For example, it is possible to implement a given data source using one or more of the processing devices 102 external to the data management system 104. A given "data source" as that term is broadly used herein may itself comprise or be part of, for example, a database management system (DBMS) or other type of data set management system, data repository or, more generally, data management system.

One or more of the components of dynamic content controller 108 may be implemented using respective portions of an analytic data store or other arrangements of one or more data stores. Such data stores may additionally encompass at least portions of the data sources 110. A given analytic data store utilized in one or more embodiments of the invention may be implemented at least in part utilizing Greenplum®. Other examples of data stores that may be used in embodiments of the invention include low-latency data stores such as SQLFire™, GemFire™, and GemFire XD™.

However, these are just examples of possible data store implementations, and numerous other data management products may be used to implement the data management system 104, dynamic content controller 108, and data sources 110 in other embodiments. For example, possible alternatives to Greenplum® for implementing an analytic data store include Hadoop™ file system, Hive™, Teradata™, Couchbase™, Netezza™ and others, as will be readily appreciated by those skilled in the art.

Also, although shown as components of the dynamic content controller 108 within data management system 104 in the FIG. 1 embodiment, at least portions of the presentation module 112, the personalization engine 114, the analytics engine 116, and the data collection module 118 may be implemented externally to the dynamic content controller 108 or data management system 104 in other embodiments.

The data management system 104 in the illustrative embodiment shown in FIG. 1 further comprises a processor 120, a memory 122 and a network interface 124. These are assumed to be elements of at least one processing device. The data management system 104 is therefore implemented in the FIG. 1 embodiment using at least one processing device comprising a processor coupled to a memory.

The processor 120 may comprise a microprocessor, a microcontroller, an application-specific integrated circuit (ASIC), a field-programmable gate array (FPGA) or other type of processing circuitry, as well as portions or combinations of such circuitry elements.

The memory 122 may comprise random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

The network interfaces 124 comprise network interface circuitry that allows the data management system 104 to communicate over the network 106 with the other processing devices 102 of the information processing system 100. Such network interface circuitry may comprise, for example, one or more conventional transceivers.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

At least a portion of the dynamic content controller 108 may comprise software that is stored in memory 122 and executed by processor 120.

Each of the processing devices 102 may similarly incorporate processor, memory and network interface elements of the type described above.

The data management system 104 and the processing devices 102 may comprise a common processing platform or multiple separate processing platforms. Such processing platforms can include virtual machines implemented using one or more hypervisors running on underlying physical infrastructure. Although shown as separate from the processing devices 102 in the present embodiment, the data management system 104 may be implemented at least in part using one or more such processing devices.

It should be understood that the particular sets of modules, engines and other components implemented in the information processing system 100 as illustrated in FIG. 1 are presented by way of example only. In other embodiments, only subsets of these components, or additional or alternative sets of components, may be used, and such components may exhibit alternative functionality and configurations.

Furthermore, it should be understood that one or more of the processing devices 102 can comprise one or more client devices through which one or more website users visit (site visitors) a given website hosted by one or more other ones of the processing devices 102 acting as servers. Alternatively, part of or all of the subject website can be hosted by the data management system 104.

The operation of the system 100 will now be described in greater detail with reference to FIG. 2, which illustrates an exemplary dynamic content control stack implemented by the dynamic content controller 108 of the data management system 104 in one embodiment.

The dynamic content control stack offers the capability for an information processing system to autonomously recommend personalized and most relevant information to website visitors based on their current and past behaviors. As shown, a dynamic content control stack 200 comprises a presentation layer 210, on top of a personalization layer 220, on top of an analytics layer 230, on top of a data access layer 245, on top of a datastore 250 coupled to data collectors 240.

The presentation layer 210 corresponds to presentation module 112 in the dynamic content controller 108 of FIG. 1. That is, in this illustrative embodiment, presentation module 112 is configured to implement presentation layer 210 and each of its functionalities described herein. As shown in FIG. 2, presentation layer 210 comprises a website portal 212, dashboards 214, and an application graphical user interface (GUI) 216. The presentation layer 210 is the highest-level layer of the control stack 200. The website portal 212 is configured to provide the personalized experience for site visitors. Dashboards 214 are configured to provide a tool for data analysts to monitor aggregated and disaggregated data on how visitors interact with the website portal 212. Application GUI 216 is configured to allow data analysts to build and customize additional GUI applications such as, but not limited to, data visualization of various data models which offer insights to stakeholders on how to improve their business and increase return on investment.

The personalization layer 220 corresponds to personalization engine 114 in the dynamic content controller 108 of FIG. 1. That is, in this illustrative embodiment, personalization engine 114 is configured to implement personalization layer 220 and each of its functionalities described herein. With the insights produced by the analytics layer 230, as will be further explained below, the personalization layer 220 provides multiple ways to personalize and enhance a visitors overall experience of the website. In illustrative embodiments, with the use of in-memory databases and Hadoop™ ecosystem tools, such website content personalization can be done in real-time or near real-time. As shown in FIG. 2, personalization layer 220 comprises site visitor segmentation functionality 222, a recommender 224, and an advertisement placement engine 226.

Site visitor segmentation 222 functions as follows. With the analytics techniques deployed in the analytics layer 230 such as, for example, clustering, the dynamic content controller is configured to segment the visitors based on website usage. Segmentation comprises identifying an individual who is conducting the current content browsing session as one of: a directed buying user; a search and deliberation user; a casual browsing user; or a knowledge building user. The dynamic content controller can then adjust recommendations and personalization of the website accordingly.

The recommender 224 is based on the visitor segmentation and techniques deployed in the analytics layer 230 such as, for example, collaborative filtering. A main goal of the recommender 224 is to make intelligent choices as to which product offerings to recommend to a visitor according to the visitor's interests.

The advertisement placement engine 226 is configured to display relevant promotions and products that would most likely attract the visitor based on the visitor's interests.

The analytics layer 230 corresponds to analytics engine 116 in the dynamic content controller 108 of FIG. 1. That is, in this illustrative embodiment, analytics engine 116 is configured to implement analytics layer 230 and each of its functionalities described herein. The analytics layer 230 is configured to deploy data mining techniques to extract insights on topics in which a visitor is interested, and relevant offerings that can be provided. In illustrative embodiments, the analytics layer 230 can apply, by way of example only, a library of machine-learning algorithms such as MADLib™ with a PostgreSQL™ database or a library of machine-learning algorithms such as Mahout™ with a Hadoop™ ecosystem to enable a scalable solution for real-time analyses.

Figure 2:
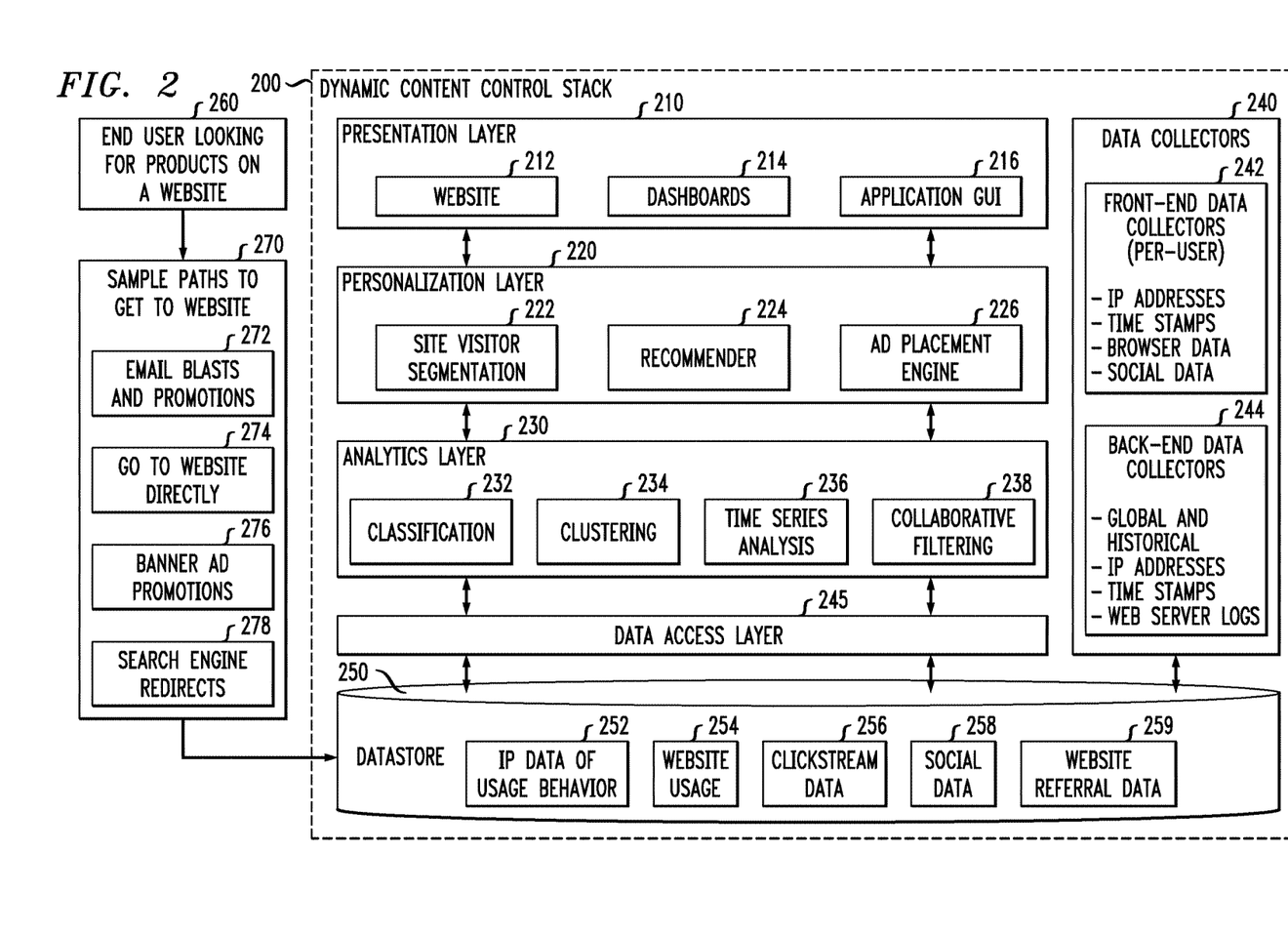
FIG. 2 is a block diagram of a dynamic content control stack implemented in the information processing system of FIG. 1.

As shown in FIG. 2, analytics layer 230 comprises classification functionality 232, clustering functionality 234, time series analysis functionality 236, and collaborative filtering functionality 238.

Classification 232 refers to the statistical process of identifying to which of a set of categories a new observation belongs on the basis of a training set of data. A few well-known classifiers that can be used by module 232 include, but are not limited to, regression, decision tree, naïve Bayes, random forest and support vector machine. The classification module is configured to deploy multiple classifiers to categorize product offerings and visitors and identify the likelihood of a visitor buying a product.

The clustering module 234 is configured to group visitors and product offerings based on their similarities. This grouping function assists the site visitor segmentation 222 for downstream personalization.

Time series analysis 236 can be used on temporal data and provides short-term predictions such as the future website traffic, how many more products are likely to be offered the next month, and the expected sales of the next month.

Collaborative filtering 238 is used by the recommendation engine 224. With the current visitor, collaborative filtering looks at historically what products similar visitors ended up purchasing or showed interest in, and therefore the module 238 recommends those products to the current visitor.

Data collectors 240 correspond to data collection module 118 in the dynamic content controller 108 of FIG. 1. That is, in this illustrative embodiment, data collection module 118 is configured to implement data collectors 240 and each of the data collection functionalities described herein. As shown in FIG. 2, data collectors 240 comprise front-end data collectors 242 (client side) and back-end data collectors 244 (web server side) which respectively collect front-end data and back-end data and feed the datastore 250.

The front-end data collectors 242 run locally on the client side throughout the entire browser session. For each visitor (per user), the front-end data collectors record data such as, by way of example, the IP address, browser environment, time stamps, username, what links on the current website the user clicked, and the data collected from the user's social network.

The back-end data collectors 244 collect global and historical server logs including all uniform resource locators (URLs) that have been accessed by a specific IP address at the given timestamps.

The data access layer (DAL) 245 provides data connectors to the datastore 250 for the analytics layer 230 to conduct data analyses. DAL 245 in computer software is a layer of a computer program which provides simplified access to data stored in persistent storage of some kind, such as an entity-relational database. The DAL 245 can return a reference to an object with attributes rather than rows of fields from a database table. An Open Database Connectivity (ODBC) connector can be used to provide the mechanism for the system to connect to any database via the ODBC driver. Then, the system can easily read and write data in the form of objects which are translated by the ODBC connector. ODBC is not necessarily part of the DAL 245. DAL 245 is at a higher level of the data connectors.

The datastore 250 is the data repository of all the data acquired and consumed by the control stack 200 (i.e., by the dynamic content controller 108). The boxes in datastore 250 highlight the five exemplary types of raw (disaggregated) data being stored. At the implementation level, the datastore 250 can be a data warehouse, a Massively Parallel Processing (MPP) database, a NoSQL datastore (such as Hadoop™) or a mix of several kinds of datastores. In-memory databases such as SQLFire™, GemFire', or GemFire XD™ can be used as the datastore to enable real-time or near real-time analyses.

IP data of usage behavior 252 refers to the IP addresses of where the visitors come from, which can benefit analyses of geographical locations or provide geo-enabled recommendation and personalization.

Website usage data 254 includes the records of how visitors interact with the website, such as the keywords being entered to search for an offering, the time being spend on each website, the links being clicked on, positions of the links being clicked on, the topics being browsed and if the visitor has linked his/her account with his/her social network accounts (such as Facebook™, Twitter™ and Google+™). If the user has registered, data 254 would also include the account name, previous orders and other historical records.

Clickstream data 256 includes the server log and the timestamps, IP addresses, user accounts and the documents the visitors have browsed.

If the users opt-in to associate their social network accounts (through the Facebook™, Twitter™ or Google™ application programming interface), their social network account, email, interests and other personal information can be saved as social data 258. For example, association of a social network account with the current website the user is visiting may be accomplished as follows. A website may be configured to allow users to login to, for example, their Facebook™, Twitter™ or Google™ account. When this is done, data associated with the social network account of the site visitor can be collected and stored as social data 258.

Website referral data 259 is built on top of the HTTP_REFERER. The HTTP_REFERER is part of the WWW standard and it records full URLs of the website's visitors before they access the current website. If the previous site is a search engine, the full URL recorded by the HTTP_REFERER would include the search keywords being used.

Blocks 260 and 270 illustrate an exemplary usage scenario.

Assume in step 260, a user is looking for a specific product online. Quite often a visitor lands on a webpage (or a group of similar webpages) with specific intentions. For example, if a visitor is looking at different brands of diapers on Amazon, this shows that the user is interested in diapers and might plan to buy diapers. If a visitor is comparing specifications of storage products such as VNX™, VPLEX™ and Isilon™, this shows that the user is interested in storage and might plan to buy a storage product. On the other hand, if the user is just browsing the "about us" and "overview" pages of the website, it is likely the user is just researching the company and may be less likely to make a purchase right away. If such subtle patterns are captured and analyzed by dynamic content controller 108, this offers valuable insights for marketing to perform up-sells, down-sells and cross-sells.

To illustrate the design, the following example will use an education website for the EMC Corporation (assignee of the present application) as an example. Generally, a visitor comes to the EMC education website because the visitor is looking for a specific offering such as a training course on Storage, Cloud or Big Data. If such an interest can be determined at the early stage of a browser session, it would help the system determine the most suitable offerings and thus greatly improve the overall site experience.

Block 270 includes a few sample paths that may lead a visitor to the EMC education website:

Email blasts and promotions 272: A visitor may land on the EMC education website by clicking in a promotion email which was part of an email blast. For example, the visitor may have clicked in an email promotion titled "Data Science Training Limited-Time Offer" and the URL the visitor clicked in the email contains an identifier to distinguish the original email content thus indicating an interest on Data Science related offerings. That is, when analyzing the incoming web traffic, the EMC website administrator cannot directly track the original email title that the visitor was viewing, but he can track the identifiers as part of an URL thus tracing down the original email where the visitor has clicked the URL.

Go to website directly 274: A visitor may come to the EMC education website by typing the URL directly or through clicking a few links on the EMC.com homepage.

Banner ad promotions 276: A visitor may come to the EMC education website by clicking an advertisement banner (such as Google™ Ads) on a third-party website. Similar to path 272, this may provide valuable insight on what topics the visitor is interested in.

Search engine redirects 278: Alternatively, a visitor may come to the EMC education website through search engine redirects. Redirects from major search engines generally include the search keywords the visitor used. The search keywords can be incorporated to determine interests of the visitor.

Figure 3:
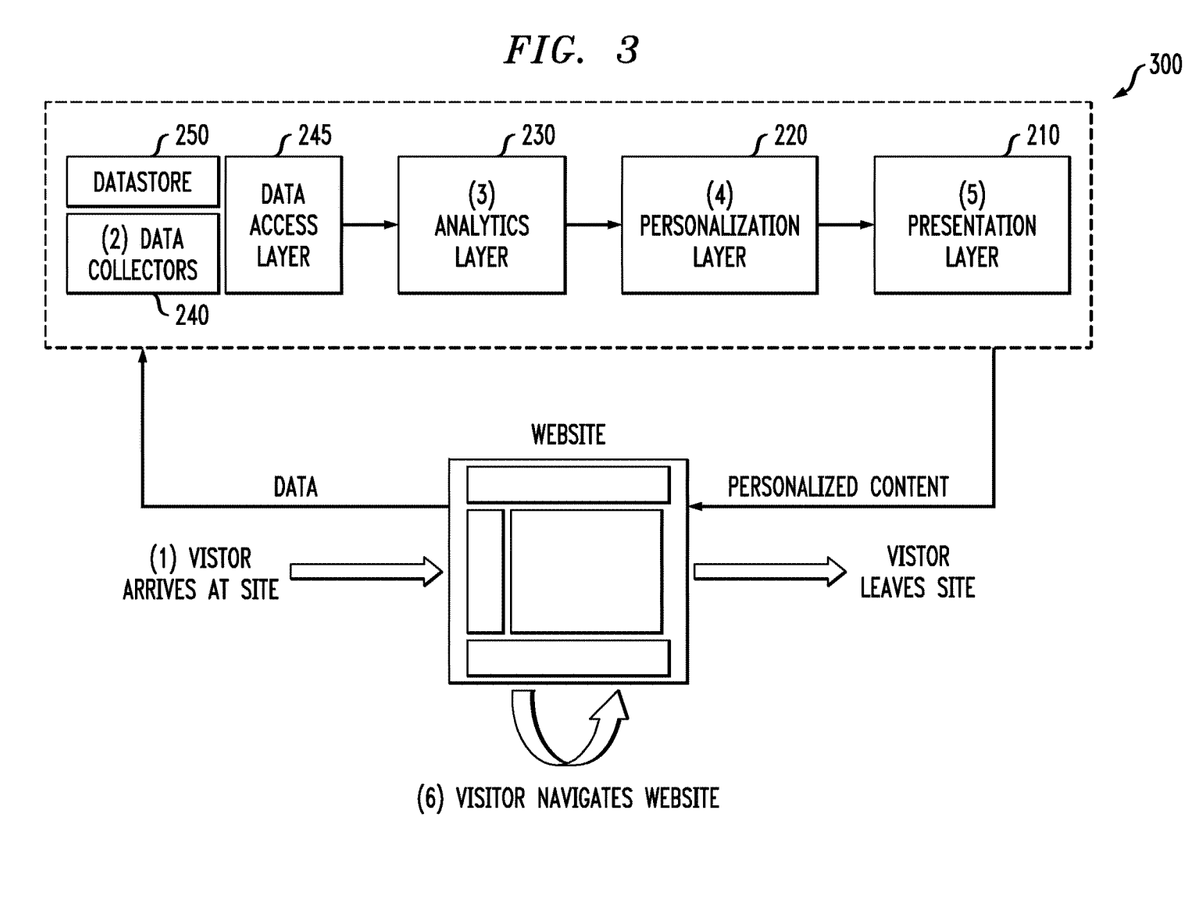
FIG. 3 is a flow diagram of an exemplary workflow of a dynamic content control stack of FIG. 2.

FIG. 3 is a flow diagram of an exemplary workflow 300 of the dynamic content control stack 200 of FIG. 2.

In step 1, a visitor arrives at the subject website and begins a current browsing session.

In step 2, data, not limited to login credentials, URL, and IP address, is captured. The data collectors 240 restructure the recent data and merge it with any other related data from the datastore 250. The relevant data is made available to the analytics layer 230 through the data access layer 245.

In step 3, the analytics layer 230 draws insights from the data provided in step 2. The insights may include, but are not limited to, the classification of the current visitor, the determination of additional items that the visitor may be interested in considering, and/or the probability of the visitor making a purchase.

In step 4, the personalization layer 210, using the insights from the analytics layer 230, determines the appropriate content to be displayed. The content may include, but is not limited to, promotions, discounts, and items that similar visitors found useful. Further personalization can be provided based on prior purchases, prior site visits, and the currently assigned customer segment. Furthermore, this personalization layer 220 can be used to run any A-B testing experiments to determine if promotions are cost-effective or what is the appropriate level of discount to offer.

In step 5, the presentation layer 210 organizes the content identified in the personalization layer 220 and builds the customized view to be presented to the visitor. This step constructs the view that the visitor will see on the website.

In step 6, the visitor navigates the website. Depending on the website, the visitor may see personalized news, weather, video, or other content. Also, targeted advertisements or product recommendations can be presented. As more data is generated from the visitor's actions on the website, steps 2 through 5 are repeated. Additional collected data may include items viewed, items added to cart, time stamps, and recommended items considered or ignored. This additional data is used to further personalize the visitors experience until the visitor leaves the site thus ending the current browsing session.

As indicated previously, functionality associated with dynamic content generation as disclosed herein can be implemented at least in part in the form of one or more software programs stored in memory and executed by a processor of a processing device such as a computer or a virtual machine.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, data management systems and associated data stores. In addition, presentation, personalization, analytics, data collection, and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. An apparatus comprising:
   a dynamic content controller implemented using at least one processing device comprising a processor coupled to a memory local to the processor such that the dynamic content controller operates as part of an in-memory database system implemented via the processor and the local memory;
   the dynamic content controller implementing an in-memory control stack configured to generate personalized content for a user during a current content browsing session associated with a given website visited by the user, the current content browsing session comprising a time period during which the given website is visited by the user;
   wherein the in-memory control stack comprises:
      a data access layer configured to access multiple types of disaggregated data associated with the given website collected and stored in an in-memory database of the in-memory database system, the disaggregated data comprising Internet usage data associated with the user that is collected and stored during the current content browsing session using one or more data collectors associated with one or more of a computing device associated with the user and one or more web servers hosting the given website;
      an analytics layer coupled to the data access layer and configured to analyze the disaggregated data;
      a personalization layer coupled to the analytics layer and configured to perform user segmentation to determine a user-type for the user based on the analysis of the disaggregated data and to generate the personalized content for presentation to the user on the given website during the current content browsing session based on the user segmentation, the user-type comprising one of: a directed buying user; a search and deliberation user; a knowledge building user; and a user not otherwise identified as a directed buying user, a search and deliberation user or a knowledge building user; and
      a presentation layer coupled to the personalization layer and configured to provide a version of the given website displaying the personalized content during the current content browsing session.

2. The apparatus of claim 1, wherein the disaggregated data comprises one or more of an Internet Protocol (IP) address, geolocation data, content browsing behavior data, browser environment data, content usage data, clickstream data, social media site usage data, and content browsing entry point data.

3. The apparatus of claim 1, wherein the personalized content comprises one or more content recommendations for the user selected based on the user segmentation and the presentation layer is configured to provide the version of the given web site displaying the personalized content by adapting content which would otherwise be displayed on the given web site to include the one or more content recommendations.

4. The apparatus of claim 1, wherein the personalized content comprises one or more targeted advertisements for the user selected based on the user segmentation and the presentation layer is configured to provide version of the given website displaying the personalized content by adapting content which would otherwise be displayed on the given website to include one or more advertisement placements comprising the one or more targeted advertisements.

5. The apparatus of claim 1, wherein the analytics layer is configured to analyze the disaggregated data utilizing one or more of a classification technique, a clustering technique, a time series analysis technique, an autoregressive integrated moving average analysis technique, and a collaborative filtering technique.

6. The apparatus of claim 1, wherein the dynamic content controller is implemented as part of a data management system.

7. The apparatus of claim 1, wherein the dynamic content controller is implemented as part of an information processing system.

8. The apparatus of claim 1, wherein the analytics layer comprises:
classification functionality configured to deploy one or more classifiers to categorize product offerings and visitors to the given website to identify a likelihood of a given visitor buying a given product;
clustering functionality configured to group visitors to the website and product offerings;
time series analysis functionality configured to utilize temporal data in the disaggregated data to provide short-term predictions regarding the given website, the short-term predictions comprising one or more of future traffic to the given website, products likely to be offered by the given website and expected sales associated with the given website; and
collaborative filtering functionality configured to identify product recommendations for a current visitor to the given website based on historically what products other visitors similar to the current visitor ended up purchasing or showing interest in.

9. The apparatus of claim 1, wherein the data collectors comprise:
one or more front-end data collectors running locally on the computing device associated with the user throughout the current browsing session that record data comprising an Internet Protocol (IP) address, browser environment, time stamps, username, what links on the current website the user clicked and data collected from the user's social network; and
one or more back-end data collectors running on the one or more web servers hosting the given website that collect global and historical server logs including uniform resource locators (URLs) accessed by a specific IP address at given timestamps.

10. The apparatus of claim 1, wherein the data access layer provides data connectors to the in-memory database for the analytics layer, the data connectors permitting the analytics layer to read and write data in the in-memory database in the form of objects with attributes rather than rows of fields from a database table.

11. A method comprising:
accessing, via a dynamic content controller implementing an in-memory control stack, multiple types of disaggregated data associated with a given web site collected and stored in an in-memory database of an in-memory database system, the disaggregated data comprising Internet usage data associated with a user that is collected and stored during a current content browsing session using one or more data collectors associated with one or more of a computing device associated with the user and one or more web servers hosting the given website, the current content browsing session being associated with a given website visited by the user and comprising a time period during which the given website is visited by the user;
analyzing the disaggregated data stored in the in-memory database;
performing user segmentation to determine a user-type for the user based on the analysis of the disaggregated data, the user-type comprising one of: a directed buying user; a search and deliberation user; a knowledge building user; and a user not otherwise identified as a directed buying user, a search and deliberation user or a knowledge building user;
generating personalized content for presentation to the user on the given website during the current content browsing session based on the user segmentation; and
providing a version of the given website displaying the personalized content during the current content browsing session;
wherein the in-memory control stack comprises a data access layer configured to perform the accessing step, an analytics layer coupled to the data access layer and configured to perform the analyzing step, a personalization layer coupled to the analytics layer and configured to perform the user segmentation performance step and the generating step, and a presentation layer coupled to the personalization layer and configured to perform the providing step; and
wherein the dynamic content controller is implemented by at least one processing device, the at least one processing device comprising a processor coupled to a memory local to the processor such that the dynamic content controller operates as part of the in-memory database system comprising the in-memory database implemented via the processor and the local memory.

12. The method of claim 11, wherein the disaggregated data comprises one or more of an Internet Protocol (IP) address, geolocation data, content browsing behavior data, browser environment data, content usage data, clickstream data, social media site usage data, and content browsing entry point data.

13. The method of claim 11, wherein the personalized content comprises one or more content recommendations for the user selected based on the user segmentation and providing the version of the given web site displaying the personalized content comprises adapting content which would otherwise be displayed on the given website to include the one or more content recommendations.

14. The method of claim 11, wherein the personalized content comprises one or more targeted advertisements for the user selected based on the user segmentation and providing the version of the given website displaying the personalized content comprises adapting content which would otherwise be displayed on the given website to include one or more advertisement placements comprising the one or more targeted advertisements.

15. The method of claim 11, wherein analyzing the disaggregated data comprises:
utilizing one or more classifiers to categorize product offerings and visitors to the given web site to identify a likelihood of a given visitor buying a given product;
grouping visitors to the web site and product offerings;
utilizing temporal data in the disaggregated data to provide short-term predictions regarding the given website, the short-term predictions comprising one or more of future traffic to the given website, products likely to be offered by the given website and expected sales associated with the given web site; and
identifying product recommendations for a current visitor to the given website based on historically what products other visitors similar to the current visitor ended up purchasing or showing interest in.

16. An article of manufacture comprising a processor-readable storage medium having encoded therein executable code of one or more software programs, wherein the one or more software programs when executed by at least one processing device cause the at least one processing device to implement the steps of:

accessing, via a dynamic content controller implementing an in-memory control stack, multiple types of disaggregated data associated with a given website collected and stored in an in-memory database of an in-memory database system, the disaggregated data comprising Internet usage data associated with a user that is collected and stored during a current content browsing session using one or more data collectors associated with one or more of a computing device associated with the user and one or more web servers hosting the given website, the current content browsing session being associated with a given website visited by the user and comprising a time period during which the given website is visited by the user;

analyzing the disaggregated data stored in the in-memory database;

performing user segmentation to determine a user-type for the user based on the analysis of the disaggregated data, the user-type comprising one of: a directed buying user; a search and deliberation user; a knowledge building user; and a user not otherwise identified as a directed buying user, a search and deliberation user or a knowledge building user;

generating personalized content for presentation to the user on the given website during the current content browsing session based on the user segmentation; and     providing a version of the given website displaying the personalized content during the current content browsing session;

wherein the in-memory control stack comprises a data access layer configured to perform the accessing step, an analytics layer coupled to the data access layer and configured to perform the analyzing step, a personalization layer coupled to the analytics layer and configured to perform the user segmentation performance step and the generating step, and a presentation layer coupled to the personalization layer and configured to perform the providing step; and     wherein the dynamic content controller is implemented by the at least one processing device, the at least one processing device comprising a processor coupled to a memory local to the processor such that the dynamic content controller operates as part of the in-memory database system comprising the in-memory database implemented via the processor and the local memory.

17. The article of manufacture of claim 16, wherein the disaggregated data comprises one or more of an Internet Protocol (IP) address, geolocation data, content browsing behavior data, browser environment data, content usage data, clickstream data, social media site usage data, and content browsing entry point data.

18. The article of manufacture of claim 16, wherein the personalized content comprises one or more content recommendations for the user selected based on the user segmentation and providing the version of the given website displaying the personalized content comprises adapting content which would otherwise be displayed on the given website to include the one or more content recommendations.

19. The article of manufacture of claim 16, wherein the personalized content comprises one or more targeted advertisements for the user selected based on the user segmentation and providing the version of the given website displaying the personalized content comprises adapting content which would otherwise be displayed on the given website to include one or more advertisement placements comprising the one or more targeted advertisements.

20. The article of manufacture of claim 16, wherein analyzing the disaggregated data comprises:

utilizing one or more classifiers to categorize product offerings and visitors to the given website to identify a likelihood of a given visitor buying a given product;

grouping visitors to the website and product offerings;

utilizing temporal data in the disaggregated data to provide short-term predictions regarding the given website, the short-term predictions comprising one or more of future traffic to the given website, products likely to be offered by the given website and expected sales associated with the given web site; and     identifying product recommendations for a current visitor to the given website based on historically what products other visitors similar to the current visitor ended up purchasing or showing interest in.

\* \* \* \* \*